United States Patent [19]
Bon

[11] 3,937,419
[45] Feb. 10, 1976

[54] SPOOL FOR FISHLINE

[75] Inventor: Gerard Bon, Blois, France

[73] Assignee: La Soie, Blois, France

[22] Filed: Mar. 7, 1974

[21] Appl. No.: 449,002

[30] Foreign Application Priority Data
Mar. 9, 1973 France .................. 73.11704

[52] U.S. Cl. .................. 242/118.4; 242/96
[51] Int. Cl.² .................. B65H 75/14
[58] Field of Search .......... 242/118.4, 118.7, 118, 242/96, 68.3, 68.5, 118.41, 68.1, 68.2, 71.1, 71.2, 71.3, 46–46.8

[56] References Cited
UNITED STATES PATENTS

| 2,436,326 | 2/1948 | Pierce | 242/46.6 |
|---|---|---|---|
| 3,652,027 | 3/1972 | Wong | 242/96 |
| 3,811,045 | 5/1974 | Turner et al. | 242/118.41 |

Primary Examiner—Leonard D. Christian
Attorney, Agent, or Firm—Baldwin, Wight & Brown

[57] ABSTRACT

A spool for transporting a fishline comprised of a hub member which has a central opening intended to be received on a spindle of a machine for winding line on the spool and to be received on an eye or guide of a fishing rod when the line is to be transferred to a reel attached to a fishing rod, and an outer annular member which actually carries the line and is received on the hub member. The hub member and the annular member both have a drum and flanges at the ends thereof. When the line is to be wound on the spool the flanges of the members are co-planar with one another and are maintained in place by cooperating ribs on the flanges of the hub member. By exerting an axial force on one of the members, the flanges on the hub member slide along the passage in the hub member drum to a position where a groove is provided, the annular member being able to rotate freely on the hub member at this position for unwinding the line. Alternately, notches and frangible tongues are provided on the flanges for maintaining the members against relative rotation initially. The frangible tongues can be fractured by exerting a relative axial force on the members thus freeing the members for relative rotation.

20 Claims, 12 Drawing Figures

SPOOL FOR FISHLINE

The present invention relates to a spool adapted to carry a threadlike strand, in particular a fishline, before it is transferred to the reel of a fishing rod.

Up to now fishline has been sold in lengths of 25 to 100 meters on plastic spools. The transfer of the fishline from the carrier spool to the reel requires the assistance of another person, i.e. one holding the carrier spool on a spindle which is usually a pencil and the other turning the crank handle of the reel onto which the fishline is wound. Without someone else's assistance, the transfer is effected by leaving the spool of fishline on the ground; the fishline unreels in turns which at the time of casting the line may cause snarling of the fishline, a problem which is well-known to fishermen.

An aim of the invention is to enable the user to unwind the spool of fishline without this problem and without the assistance of another person on the use of means other than the fishing rod and reel.

This result is obtained without unacceptable increases in the production cost of the fishline by modifications of the equipment or modus operandi of winding the fishline on the reel.

The spool according to the invention is comprised of two parts:
1. an outer annular member adapted to actually carry the fishline;
2. a central hub member which may be secured to some support surface and which provides the spindle on which the annular member can rotate without appreciable friction.

Means are provided for limiting or arresting the axial displacement of the annular member along the axis of the hub member, and other means for fixing the annular member on the central member when the fishline is wound on the spool by the manufacturer which are inoperative during the unreeling of the spool.

Preferably, the annular member is formed as a hollow cylindrical drum with flat flanges at the ends thereof, each flange having at least one central aperture which communicates with the interior of the drum through which the hub member may pass. The passage formed by the openings in the flanges and the interior surface of the drum has at least two generally circular portions of different diameters, the diameters being determined without taking into account the presence of grooves or female portions, and removable ribs or male portions which may be provided.

The hub member which is preferably fabricated at least in part of elastic material comprises at least two generally circular portions of different diameters, these diameters also being determined without taking into account the presence of grooves or female portions and removable ribs or male portions which may be present.

The largest diameter portion on the hub member is smaller than the largest diameter portion in the passage on the annular member, but it is greater than the other diameter portions of the passage or in the vicinity thereof so that the allowance therebetween corresponds to a friction fit. When the largest diameter portion on the hub member is brought into alignment with the largest diameter portion of the passage in the annular portion, the diameters of the other portions of the hub member are smaller than those of the corresponding portions of passage in the annular member so that the hub member can rotate with respect to the annular member without appreciable friction. When the hub member is displaced axially with respect to the annular member from the position in which its largest diameter portion is in alignment with the largest diameter portion in the passage of the annular member, there is a point at which if the displacement is effected at least in a certain direction the movement is arrested or at least held up by substantial forces of friction.

Nevertheless, the scope of the invention includes the possibility of interchanging the roles of the annular member and the hub member, for example, if the smallest diameter portion of the passage in the annular member is made greater than the smallest diameter portion of the hub member but it is less than the diameter of another of the portions of the hub member or if it is the vicinity thereof the allowance therebetween corresponds to a friction fit.

Likewise, a groove may be replaced by a rib and vice versa without going beyond the scope of the invention.

According to a particular embodiment of the invention, the fixing of the hub member against rotation relative to the annular member for winding the fishline on the annular member is obtained by providing a single non-circular portion on the hub member, in particular tongues or notches, and a corresponding non-circular portion on the annular member, in particular notches or tongues.

According to an embodiment, the tongues are not intended to be fractured or removed and the diameters of the hub member and the annular member are calculated so that when the tongues are received in the notches, the hub is able to be displaced with respect to the annular member only insofar as it can overcome tight frictional contact. A displacement of the hub member by axial translation with respect to the annular member is overcoming the resistance due to the force of friction enables the position to be reached in which the largest diameter portion of the passage in the annular member, preferably a groove in the inner surface of the drum, where the hub member is freely rotatable with respect to the annular member; the force required to effect this displacement is rather great so that it is not produced inadvertently.

Such an embodiment is especially suited for small diameter spools. For larger diameter spools, the deformation due to the force exerted radially by the fishline as well as the dimensional variations in the material are such that it is difficult to maintain the tightness of the frictional contact of the hub member in the passage of the annular member within sufficiently accurate limits.

In such a case, another embodiment is preferred in which the diameters of the hub member and the annular member are chosen so that the hub member remains in a position in which it can rotate freely with respect to the annular member the members being fixed with respect to each other during the winding of the line on the spools by tongues received in grooves, the shape and size of which are calculated so that the rotational movement of the hub member is transmitted to the annular member and so that before the unwinding of the line from the spool they are broken off or fractured by a rather small force without needing a tool, but which is large enough so that this does not occur inadvertently.

In an embodiment which will be discussed hereinbelow, the tongues or male portions are integral with the hub member and the notches or female portions are formed in the annular member; however, without going beyond the scope of the invention, the tongues or male portions could be integral with the flange of the annular member and the grooves or female portions could be formed in the periphery of the hub member.

The invention will be explained in greater detail with reference to two non-limiting examples corresponding to each of the embodiments described hereinabove and illustrated in the accompanying drawings, in which.

Like elements have the same reference numerals throughout the drawings.

Figure 1:
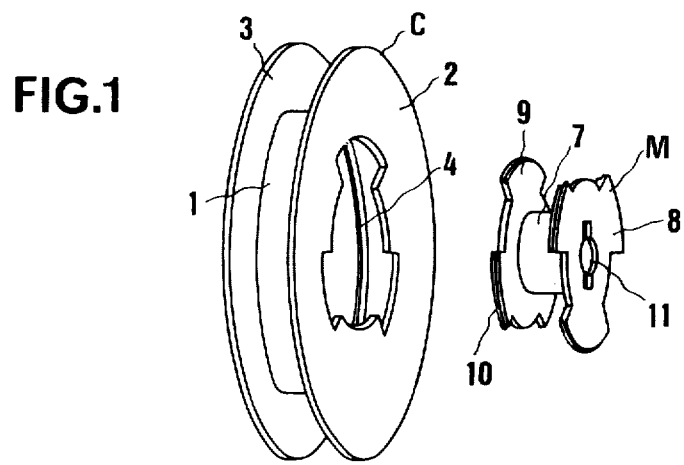
FIG. 1 shows a perspective view of the members of the spool of a first embodiment.
Figure 2:
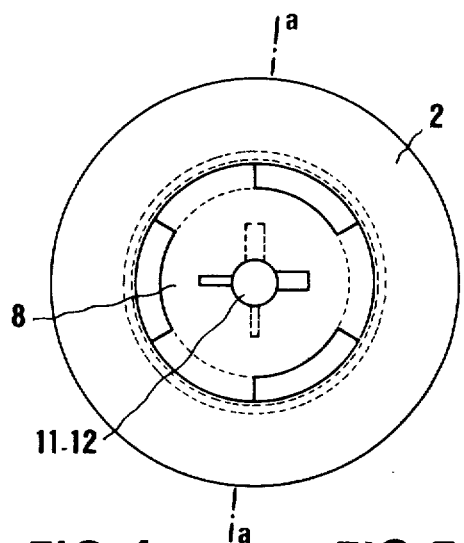
FIG. 2 shows a front view of the same spool ready to receive a fishline.
Figure 3:
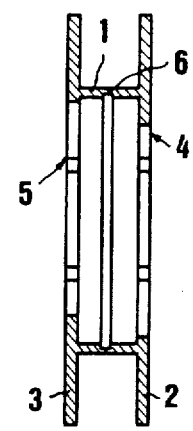
FIG. 3 shows a view in axial cross-section, the hub member being assumed to be inclined.
Figures 4, 5:
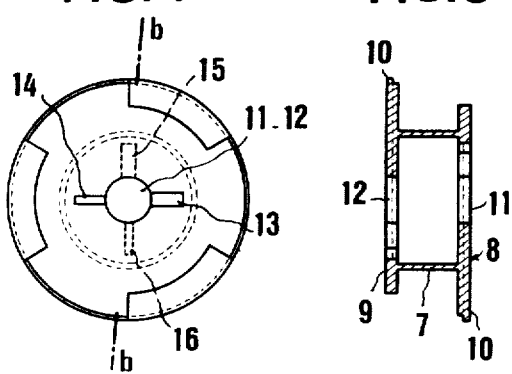
FIG. 4 shows a front view of the hub member of the spool of the first embodiment.
FIG. 5 shows an axial cross-section of the hub member.
Figure 6:
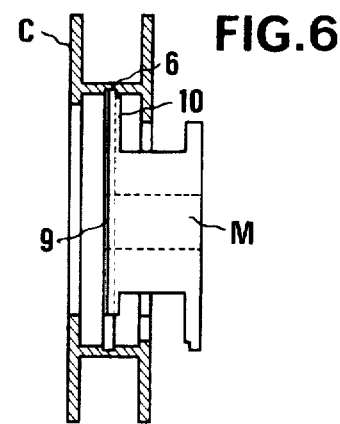
FIG. 6 shows a side view of the spool of the first embodiment in unreeling position with the annular member shown in cross-section.

The spool, shown in FIGS. 1–6 by way of a first non-limiting example, comprises two separable parts or members, an outer annular member C for storing and carrying the fishline before unwinding and a central hub member M fitted inside the annular member.

The annular member C comprises a cylindrical drum 1 on which the fishline is wound and two lateral circular flanges 2 and 3 at the ends of the drum 1. Openings 4 and 5 are provided in the central area of the flanges 2 and 3 and are adapted to receive corresponding portions of the hub member M, the dimensions of the openings 4 and 5 being less than the inner diameter of the drum 1.

In the illustrated embodiment of FIGS. 1–6, openings 4 and 5 are formed by three sectors of a circle of the same diameter alternating with three sectors of a circle having a smaller diameter, the larger diameter sectors being disposed directly opposite the smaller diameter sectors and vice versa. The inner surface of the drum 1 has a circular groove 6 midway between the flanges 2 and 3; this groove provides an essential function of the present spool which will be discussed hereinbelow.

The hub member M comprises a hollow cylindrical drum 7 and flanges 8 and 9, the shape of the flanges being adapted to the openings 4 and 5 in the flange of the annular member. The hub member M is formed of elastic material. The radius of the outer edge of the larger diameter portions of the flanges 8 and 9 is substantially equal to the radius of the corresponding parts of the openings 4 and 5 in the flanges 2 and 3. These outer edges of the larger diameter portions of the flanges 8, 9 are provided with outwardly projecting ribs 10 making the overall radial dimension of these sectors slightly greater than the corresponding portions of the openings in the flanges of the annular member. The thickness of the rib 10 is slightly less than half the width of circular groove 6 in the annular member. The axial dimension of the hub member M is substantially equal to that of the annular member C. The drum 7 of the hub member is hollow and is open to the surroundings through two openings 11, 12 formed in the flanges 8, 9. These openings 11, 12 are generally circular in shape and have a pair of diametrically opposed radial slots 15, 16, the radial slots 15, 16 of the flange 8 being perpendicular to the radial slots 15, 16 of the flange 9.

The operation of the novel spool according to the invention is as follows: the spool is delivered to the user with the fishline, wound on the drum 1 of the annular carrier member C between the two flanges 2 and 3, the hub member M being in position inside the annular member and the flanges of the hub member and the annular member being co-planar and maintained in position by the detent means formed by the elastic ribs 10 which are compressed by the fact that their diameters, are greater than that of the corresponding portions of the openings of the annular member.

For use, pressure is exerted against the hub member for example, by one's thumbs in order to displace the hub member along its axis relative to the annular member. The ribs 10 slide along the inner surface of the drum 1 until they reach the groove 6 into which they expand.

At this point, the pressure exerted on the hub member is released, the ribs 10 return to their normal shape as their diameters are less than the diameters of the closed end of the groove 6; the annular member C can then rotate on the hub member without appreciable friction. It is simply necessary to secure the hub member M to some kind of support, preferable a section of the fishing rod, the shape and the dimensions of the openings 11, 12 being calculated to adapt thereto, and an unwinding mechanism is thus obtained which can transfer the fishline from the spool to the reel without snarling or causing any other problem.

If desired, the ribs 10 formed on the outer edges of the other flange of the hub member could be inserted into the groove 6 in another annular member. It is also possible to insert the ribs 10 on the flange of the hub member of a third spool into the groove 6 of the annular member of the first spool. Indeed, as mentioned hereinabove, the thickness of the rib 10 is slightly less than half the width of the groove 10 in which it is inserted. Accordingly, it is possible to unwind several spools on which a single continuous line is wound.

It may be noted that the particular shape of the opening 4, 5 annular member and in the flanges 8, 9 of the hub member is not an essential feature when unwinding the spool. It is, however, useful before being sold to the user when the line is wound on the spool, because it enables a force to be exerted on the annular member through the hub member which permits the winding of the line under suitable tension.

Figure 7:
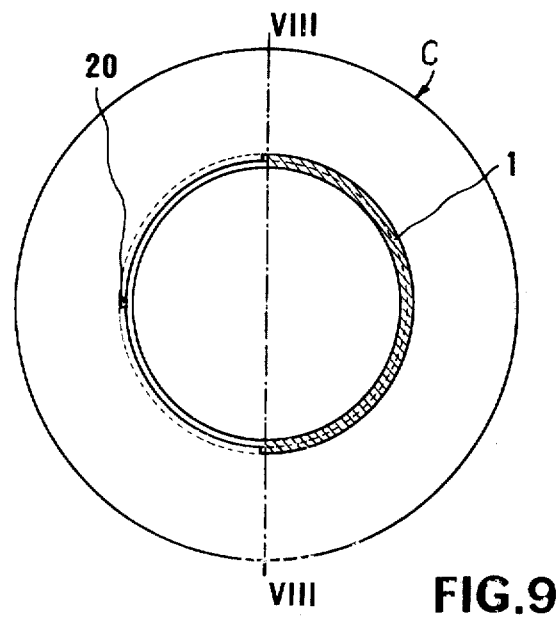
FIG. 7 shows a front view, half in section, of the annular member of the second embodiment of the spool.
Figure 8:
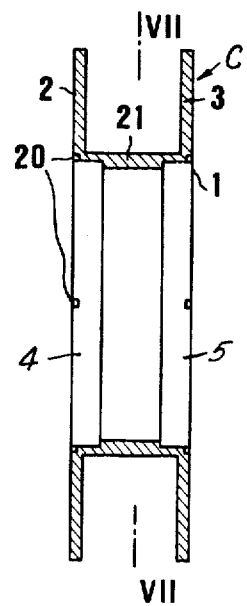
FIG. 8 shows a cross-sectional view of the same annular member.
Figure 9:
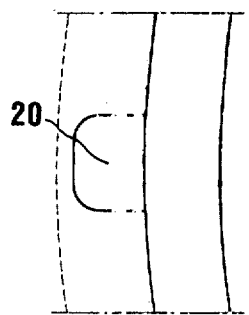
FIG. 9 shows an enlarged detail of the detent means of FIG. 7.
Figure 10:
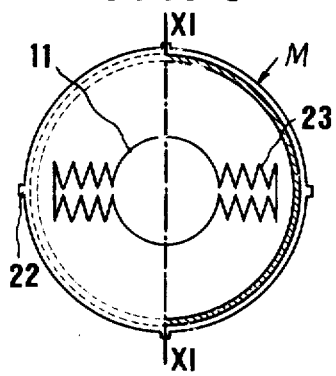
FIG. 10 shows a front view, half in section, of the hub member of the spool of the second embodiment.
Figure 11:
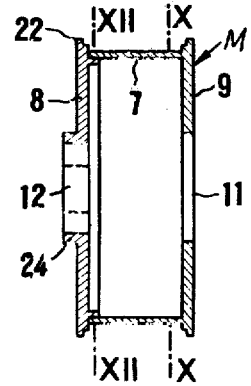
FIG. 11 shows a cross-sectional view of the same hub member.
Figure 12:
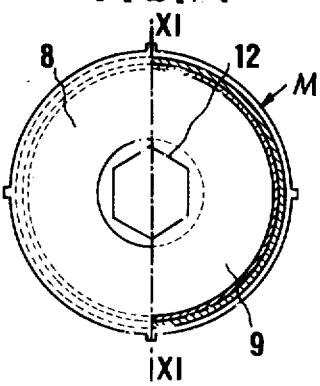
FIG. 12 shows a rear view, half in section, of the same hub member.

The spool, shown in FIGS. 7–12 by way of a second non-limiting embodiment, also comprises two separable parts or members, a hub member M and an annular carrier member C. The annular member C comprises, as in the first embodiment, a hollow cylindrical drum 1 and two circular flanges 2, 3, at the ends of the drum and having openings 4, 5 therein. The openings are of generally circular configuration with four notches 20 of small dimensions, the depth of the notches being less than the thickness of the flanges. The inner surface of the drum 1 has a wide circular rib 21 whose function will be explained below.

The hub member M comprises a hollow cylindrical drum 7 and flanges 8, 9. The flanges 8, 9 are generally circular in configuration and, have four frangible tongues 22 corresponding to the dimensions of the notches 20.

If the line is thick, the required length is wound around two spools arranged side by side. An axially outwardly extending collar 24 having an opening 12 of a first spool is inserted into an opening 11 in a second spool (not shown). The tongues 22 are received in the notches 21, securing the hub member M relative to the annular member C against relative axial displacement as well as relative angular displacement. When the spool is to be used, pressure is exerted axially on the hub member, for example, by the user's thumbs, so as to fracture the tongues 22 along one of the flanges of the hub member. Thereafter it is preferable to exert a force in the opposite direction to fracture the frangible tongues along the other flange of the hub member to ensure freedom of rotation. If this precaution is not taken, the annular member could be arrested during its rotation by the unfractured tongues if these tongues 22 were once again to enter the notches 20.

The interior of the drum 7 communicates with the exterior through the opening 11 in its flange 8 and through the opening 12 in the flange 9.

The opening 11 is intended to secure the hub member M on a support and is of circular configuration with diametrically opposed toothlike formations 23 for increasing flexibility and improving the gripping contact.

The opening 12 is intended for fastening the spool on the spindle of the machine for winding the line on the spool and is hexagonal to correspond to the cross-section of the spindle on the machine. The collar 24 increases the stability of the spool during the winding on of the line and makes it possible to fix two spools together which are to carry one single line.

The collar 24 is cylindrical in shape and has an outer diameter substantially equal to that of the circular part of the opening 11 and therefore is able to be inserted with a friction fit into the opening 11 of another similar spool.

The operation of the spool is as follows: the spool is delivered to the user with the line wound on the drum 1 between the flanges 2 and 3. The hub member is freed by fracturing the frangible tongues as mentioned above. It is simply necessary to pass the opening 11 of the hub over a support for unwinding the line. The support is preferably the eye and guide of the fishing rod for which the line is intended; the diameter of the opening 11 is calculated in accordance therewith, i.e. it is ordinarily hardly less than 22 mm, this dimension corresponding to the diameter of the first eyes or guides of the thinnest casting rods now in use. If the user has a larger or thicker rod, since the diameter thereof will be narrower towards the end diminishing to a diameter less than 20 mm, an eye or guide will necessarily be found with a diameter corresponding to the spool.

I claim:

1. A spool for line comprising an annular member and a hub member, said annular member including a hollow core and a pair of axially spaced radially outwardly directed peripheral flanges between which line is adapted to be wound and unwound, said hub member being housed substantially entirely within said hollow core, and frangible means interlocking said annular member and said hub member together for simultaneous unified rotation about an axis of rotation of said hub member in an unbroken condition of said frangible interlocking means and providing free relative rotation between said annular member and said hub member in a broken condition of said frangible interlocking means.

2. The spool as defined in claim 1 wherein said frangible interlocking means are defined by at least a single frangible tongue of one of said members engaged in a notch of a remainder of said members.

3. The spool as defined in claim 1 wherein said hub member includes means for attaching said hub member non-rotatably to the eye of a fishing rod.

4. The spool as defined in claim 1 wherein said hub member includes an axially outwardly directed projection, noncircular aperture means in said axial projection for nonrotationally securing said hub member to a winding spindle for winding line upon said annular member when said frangible means are unbroken, and said hub means further includes circular aperture means for receiving therein an axial projection of another like hub member whereby a single unbroken length of line can be wound upon an annular member associated with each hub member.

5. The spool as defined in claim 1 wherein said hub member includes an axially outwardly directed projection, noncircular aperture means in said axial projection for nonrotationally securing said hub member to a winding spindle for winding line upon said annular member when said frangible means are unbroken, said hub means further includes circular aperture means for receiving therein an axial projection of another like hub member whereby a single unbroken length of line can be wound upon an annular member associated with each hub member, said hub member being formed of two parts, said axial projection and associated noncircular aperture being formed in one of said parts, and said circular aperture means being formed in another of said parts.

6. The spool as defined in claim 2 wherein said hub member includes means for attaching said hub member non-rotatably to the eye of a fishing rod.

7. The spool as defined in claim 2 wherein said hub member includes an axially outwardly directed projection, noncircular aperture means in said axial projection for nonrotationally securing said hub member to a winding spindle for winding line upon said annular member when said frangible means are unbroken, and said hub means further includes circular aperture means for receiving therein an axial projection of another like hub member whereby a single unbroken length of line can be wound upon an annular member associated with each hub member.

8. The spool as defined in claim 2 wherein said hub member includes an axially outwardly directed projection, noncircular aperture means in said axial projection for nonrotationally securing said hub member to a winding spindle for winding line upon said annular member when said frangible means are unbroken, said hub means further includes circular aperture means for receiving therein an axial projection of another like hub member whereby a single unbroken length of line can be wound upon an annular member associated with each hub member, said hub member being formed of two parts, said axial projection and associated noncircular aperture being formed in one of said parts, and said circular aperture means being formed in another of said parts.

9. The spool as defined in claim 6 wherein said hub member includes an axially outwardly directed projection, noncircular aperture means in said axial projection for nonrotationally securing said hub member to a winding spindle for winding line upon said annular member when said frangible means are unbroken, and said hub means further includes circular aperture means for receiving therein an axial projection of another like hub member whereby a single unbroken length of line can be wound upon an annular member associated with each hub member.

10. The spool as defined in claim 9 wherein said hub member includes an axially outwardly directed projection, noncircular aperture means in said axial projection for nonrotationally securing said hub member to a winding spindle for winding line upon said annular member when said frangible means are unbroken, said hub means further includes circular aperture means for receiving therein an axial projection of another like hub member whereby a single unbroken length of line can be wound upon an annular member associated with each hub member, said hub member being formed of two parts, said axial projection and associated noncircular aperture being formed in one of said parts, and said circular aperture means being formed in another of said parts.

11. The spool as defined in claim 1 wherein said frangible interlocking means are disposed at inner and outer peripheral surfaces of said respective annular member and hub member, and means for limiting relative axial movement between said annular member and said hub member after the breaking of said frangible interlocking means.

12. The spool as defined in claim 1 wherein said frangible interlocking means are defined by at least a single frangible tongue of one of said members engaged in a notch of a remainder of said members located at axially opposite ends of said spool.

13. The spool as defined in claim 11 wherein said axial movement limiting means includes a pair of axially spaced radially outwardly directed flanges of said hub member having sandwiched therebetween a radially inwardly directed bead of said annular member.

14. The spool as defined in claim 13 wherein said frangible interlocking means are defined by at least a single frangible tongue of one of said members engaged in a notch of a remainder of said members located at axially opposite ends of said spool.

15. A spool for line comprising an annular member and a hub member, said annular member including a hollow core and a pair of axially spaced radially outwardly directed peripheral flanges between which line is adapted to be wound and unwound, said hub member being housed substantially entirely within said hollow core, and resilient means directly interlocking said annular member and said hub member together for simultaneous unified rotation about an axis of rotation in a stressed condition of said resilient interlocking means and providing free relative rotation between said annular member and said hub member in an unstressed condition of said resilient interlocking means.

16. The spool as defined in claim 15 wherein said resilient interlocking means are defined by at least a resilient tongue of one of said members radially frictionally engaged against an opposing surface of a remainder of said members in said stressed condition.

17. The spool as defined in claim 15 wherein said hub member includes means for attaching said hub member non-rotatably to an eye of a fishing rod.

18. The spool as defined in claim 15 wherein said hub member includes axially opposite end walls, axially aligned circlar aperture means in said end walls, a pair of diametrically opposed notches in each end wall opening into its associated aperture means, and the pair of notches in one end wall being angularly offset from the pair of notches in the other of the end walls.

19. The spool as defined in claim 16 wherein said resilient tongue projects radially outwardly of said hub member and said opposing surface is defined by a radially inwardly opening notch of said annular member.

20. The spool as defined in claim 16 including means for limiting relative axial movement between said annular member and said hub member in the unstressed condition of said resilient interlocking means.

* * * * *